US011668783B2

(12) United States Patent
Nishiwaki et al.

(10) Patent No.: US 11,668,783 B2
(45) Date of Patent: Jun. 6, 2023

(54) V2X VEHICLE-MOUNTED DEVICE AND V2X RELAY

(71) Applicant: Mitsubishi Electric Corporation, Tokyo (JP)

(72) Inventors: Takeshi Nishiwaki, Tokyo (JP); Ryosuke Nishimura, Tokyo (JP); Masuo Ito, Tokyo (JP); Takashi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 17/279,719

(22) PCT Filed: Nov. 13, 2018

(86) PCT No.: PCT/JP2018/041904
§ 371 (c)(1),
(2) Date: Mar. 25, 2021

(87) PCT Pub. No.: WO2020/100204
PCT Pub. Date: May 22, 2020

(65) Prior Publication Data
US 2022/0034991 A1 Feb. 3, 2022

(51) Int. Cl.
*G01S 5/00* (2006.01)
*H04W 4/46* (2018.01)
(Continued)

(52) U.S. Cl.
CPC .......... *G01S 5/0072* (2013.01); *H04W 4/026* (2013.01); *H04W 4/027* (2013.01); *H04W 4/029* (2018.02); *H04W 4/44* (2018.02); *H04W 4/46* (2018.02)

(58) Field of Classification Search
CPC ......... G01S 5/0072; H04W 4/46; H04W 4/44; H04W 4/029; H04W 4/026; H04W 4/027; H04W 84/12; H04L 67/52; H04L 67/535
See application file for complete search history.

(56) References Cited

U.S. PATENT DOCUMENTS

2014/0200038 A1* 7/2014 Rao ........................ G01C 21/32
455/457
2015/0304818 A1* 10/2015 Carlsson ............... H04W 4/029
455/456.1
(Continued)

FOREIGN PATENT DOCUMENTS

JP 2018-518913 A 7/2018

*Primary Examiner* — Ernest G Tacsik
(74) *Attorney, Agent, or Firm* — Sughrue Mion, PLLC; Richard C. Turner

(57) ABSTRACT

A conventional V2X communication system relays vehicle information received from vehicles, from a base station to all vehicles in an area. Accordingly, a problem arises in that unnecessary transmission to vehicles which do not require vehicle information occurs, resulting in increase in a traffic amount in communication. According to the present disclosure, only if it is determined, based on information that is held by a vehicle or a base station and that is about an area in which direct transmission or reception is difficult, that direct transmission of vehicle information to another vehicle or reception of vehicle information transmitted from the other vehicle is difficult, the vehicle information is transmitted to the other vehicle via the base station.

18 Claims, 14 Drawing Sheets

(51) Int. Cl.
*H04W 4/44* (2018.01)
*H04W 4/029* (2018.01)
*H04W 4/02* (2018.01)

(56) References Cited

U.S. PATENT DOCUMENTS

2018/0184270 A1   6/2018  Chun et al.
2020/0120459 A1*  4/2020  Nguyen ................ H04W 40/22
2022/0176975 A1*  6/2022  Nakamura .......... H04W 40/026

* cited by examiner

FIG. 7

```
DIRECT TRANSMISSION DIFFICULTY AREA D
| $X_{TX1}$ (LONGITUDE) | $Y_{TX1}$ (LATITUDE) | $dX_{TX1}$ (LONGITUDE WIDTH) | $dY_{TX1}$ (LATITUDE WIDTH) |

DIRECT TRANSMISSION DIFFICULTY AREA E
| $X_{TX2}$ (LONGITUDE) | $Y_{TX2}$ (LATITUDE) | $dX_{TX2}$ (LONGITUDE WIDTH) | $dY_{TX2}$ (LATITUDE WIDTH) |

.
  .
  .

DIRECT TRANSMISSION DIFFICULTY AREA n
| $X_{TXn}$ (LONGITUDE) | $Y_{TXn}$ (LATITUDE) | $dX_{TXn}$ (LONGITUDE WIDTH) | $dY_{TXn}$ (LATITUDE WIDTH) |
```

LIST OF DIRECT TRANSMISSION DIFFICULTY AREAS

FIG. 8

DIRECT TRANSMISSION DIFFICULTY AREA D

| $X_{TX1}$ | $Y_{TX1}$ | $dX_{TX1}$ | $dY_{TX1}$ | $\theta_{TX1}$ (TRAVELING ORIENTATION) | $d\theta_{TX1}$ (ORIENTATION WIDTH) |

DIRECT TRANSMISSION DIFFICULTY AREA E

| $X_{TX2}$ | $Y_{TX2}$ | $dX_{TX2}$ | $dY_{TX2}$ | $\theta_{TX2}$ (TRAVELING ORIENTATION) | $d\theta_{TX2}$ (ORIENTATION WIDTH) |

⋮

DIRECT TRANSMISSION DIFFICULTY AREA n

| $X_{TXn}$ | $Y_{TXn}$ | $dX_{TXn}$ | $dY_{TXn}$ | $\theta_{TXn}$ (TRAVELING ORIENTATION) | $d\theta_{TXn}$ (ORIENTATION WIDTH) |

LIST OF DIRECT TRANSMISSION DIFFICULTY AREAS

FIG. 12

DIRECT RECEPTION DIFFICULTY AREA F

| $X_{RX1}$ (LONGITUDE) | $Y_{RX1}$ (LATITUDE) | $dX_{RX1}$ (LONGITUDE WIDTH) | $dY_{RX1}$ (LATITUDE WIDTH) |

DIRECT RECEPTION DIFFICULTY AREA G

| $X_{RX2}$ (LONGITUDE) | $Y_{RX2}$ (LATITUDE) | $dX_{RX2}$ (LONGITUDE WIDTH) | $dY_{RX2}$ (LATITUDE WIDTH) |

*
*
*
*

DIRECT RECEPTION DIFFICULTY AREA n

| $X_{RXn}$ (LONGITUDE) | $Y_{RXn}$ (LATITUDE) | $dX_{RXn}$ (LONGITUDE WIDTH) | $dY_{RXn}$ (LATITUDE WIDTH) |

LIST OF DIRECT RECEPTION DIFFICULTY AREAS

FIG. 13

| DIRECT RECEPTION DIFFICULTY AREA F | | | | | |
|---|---|---|---|---|---|
| $X_{RX1}$ | $Y_{RX1}$ | $dX_{RX1}$ | $dY_{RX1}$ | $\theta_{RX1}$ (TRAVELING ORIENTATION) | $d\theta_{RX1}$ (ORIENTATION WIDTH) |

| DIRECT RECEPTION DIFFICULTY AREA G | | | | | |
|---|---|---|---|---|---|
| $X_{RX2}$ | $Y_{RX2}$ | $dX_{RX2}$ | $dY_{RX2}$ | $\theta_{RX2}$ (TRAVELING ORIENTATION) | $d\theta_{RX2}$ (ORIENTATION WIDTH) |

⁝

| DIRECT RECEPTION DIFFICULTY AREA n | | | | | |
|---|---|---|---|---|---|
| $X_{RXn}$ | $Y_{RXn}$ | $dX_{RXn}$ | $dY_{RXn}$ | $\theta_{RXn}$ (TRAVELING ORIENTATION) | $d\theta_{RXn}$ (ORIENTATION WIDTH) |

LIST OF DIRECT RECEPTION DIFFICULTY AREAS

V2X VEHICLE-MOUNTED DEVICE AND V2X RELAY

CROSS REFERENCE TO RELATED APPLICATIONS

This application is a National Stage of International Application No. PCT/JP2018/041904 filed on Nov. 13, 2018.

TECHNICAL FIELD

The present disclosure relates to a V2X vehicle-mounted device and a V2X relay.

BACKGROUND ART

In recent years, safe driving assistant systems using V2V (Vehicle to Vehicle) communication have been proposed. In each safe driving assistant system, vehicle information (e.g., the current position, the traveling direction, and acceleration/deceleration) and the like are transmitted from a host vehicle to another vehicle nearby by direct communication means via radio waves by using a communication terminal mounted in the host vehicle, and meanwhile, vehicle information transmitted from the other vehicle nearby is received, then the possibility of a collision is determined from the received vehicle information and notifications are provided to the drivers.

The notifications from the system allow the drivers to recognize a situation where there is the possibility of a collision, and thus a traffic accident due to false perceptions by the drivers can be prevented.

In the aforementioned system, radio waves may not reach another vehicle requiring vehicle information owing to, for example, blocking of the radio waves by a building or a tree during transmission. If the vehicle information does not reach the other vehicle, the safe driving assistant system cannot determine the possibility of a collision and thus cannot provide notifications to the drivers.

As a method for avoiding such an event, a method is conceivable which uses a so-called V2X (Vehicle to Everything) communication system in which vehicle information to be exchanged through direct communication between vehicles is relayed by using not only communication between the vehicles but also communication between infrastructures such as relays. For example, in a communication method described in Patent Document 1, a system is described as an example in which relaying is performed by using control UE (User Equipment) as a relay node for relaying a communication service. In the system, a message transmitted from a management entity causes switching to a mode in which the control UE operates as the relay node.

CITATION LIST

Patent Document

Patent Document 1: Japanese Laid-open Patent Publication (translation of PCT application) No. 2018-518913

SUMMARY OF THE INVENTION

Problems to be Solved by the Invention

However, in the system described as an example in Patent Document 1, the control UE used as the relay node relays all the vehicle information received from vehicles, to all vehicles in an area. Accordingly, a problem arises in that unnecessary transmission to vehicles which do not require vehicle information occurs, resulting in increase in a traffic amount in communication.

The present disclosure has been made to solve the above problem, and an object of the present disclosure is to provide a V2X vehicle-mounted device and a V2X relay for preventing increase in a traffic amount by reducing unnecessary transmission.

Solution to the Problems

A V2X vehicle-mounted device according to the present disclosure includes: first communication means configured to directly transmit vehicle information between vehicles; second communication means configured to communicate with a base station; and means configured to, based on the vehicle information and information that is received by the second communication means and that is about an area in which direct transmission is difficult, determine presence or absence of a vehicle in the area in which direct transmission is difficult, wherein the vehicle information is transmitted by the second communication means only if it is determined that a transmission-destination vehicle is present in the area in which direct transmission is difficult.

A V2X relay according to the present disclosure includes: relay communication means configured to receive vehicle information about a first vehicle and transmit the vehicle information to a second vehicle; and means including information about an area in which direct transmission from the first vehicle to the second vehicle is difficult, and configured to, based on the vehicle information and the information about the area, determine presence or absence of the first vehicle in the area, wherein the vehicle information is transmitted to the second vehicle only if it is determined that the first vehicle is present in the area.

A V2X relay according to the present disclosure includes: relay communication means configured to receive first vehicle information about a first vehicle and transmit the first vehicle information to a second vehicle; and means including information about an area in which reception of the first vehicle information directly transmitted from the first vehicle is difficult, and configured to, based on second vehicle information about the second vehicle and the information about the area, determine presence or absence of the second vehicle in the area, wherein the first vehicle information is transmitted to the second vehicle only if it is determined that the second vehicle is present in the area.

Effect of the Invention

The V2X vehicle-mounted device and the V2X relay according to the present disclosure make it possible to prevent increase in the communication traffic amount of a V2X communication system by reducing unnecessary transmission.

BRIEF DESCRIPTION OF THE DRAWINGS

FIG. 7 is a diagram illustrating a list of direct transmission difficulty areas in embodiment 1.

FIG. 8 is another diagram illustrating the list of direct transmission difficulty areas in embodiment 1.

FIG. 12 is a diagram illustrating a list of direct reception difficulty areas in FIG. 11.

FIG. 13 is another diagram illustrating the list of direct reception difficulty areas in FIG. 11.

DESCRIPTION OF EMBODIMENTS

Figure 1:
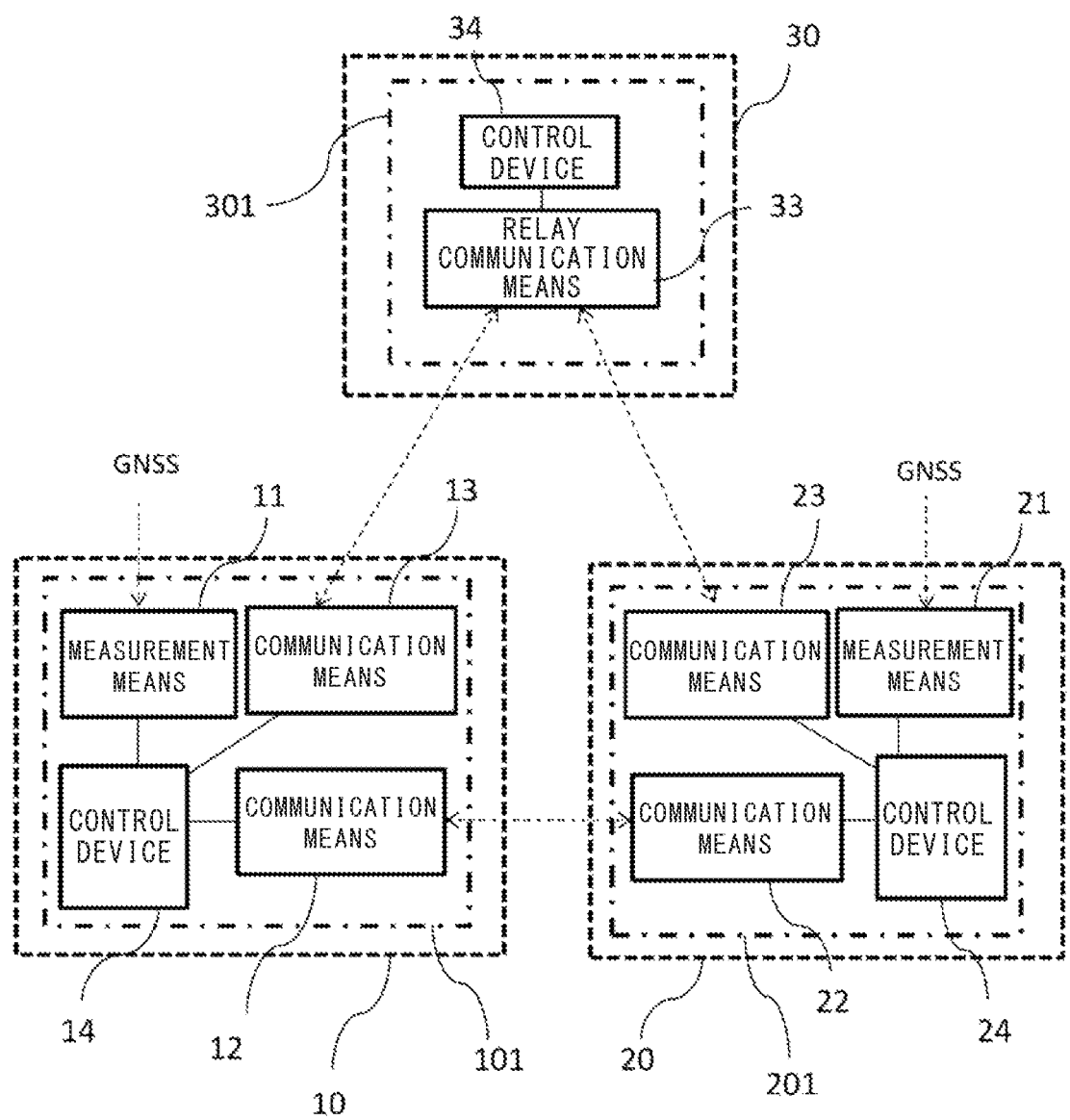
FIG. 1 is a diagram showing an overall configuration of a V2X communication system according to embodiment 1.

Hereinafter, a vehicle-mounted device (hereinafter, referred to as a V2X vehicle-mounted device) and a relay (hereinafter, referred to as a V2X relay) in a V2X communication system according to the present disclosure, and a communication method using the same, will be described with reference to the drawings by way of a preferred embodiment using an intersection collision prevention warning system as an example. Note that the same components and corresponding parts are denoted by the same reference characters, and the detailed descriptions thereof have been omitted. Similarly, redundant descriptions of the constituents denoted by the same reference characters have been omitted also in the following embodiments.

Embodiment 1

Figure 2:
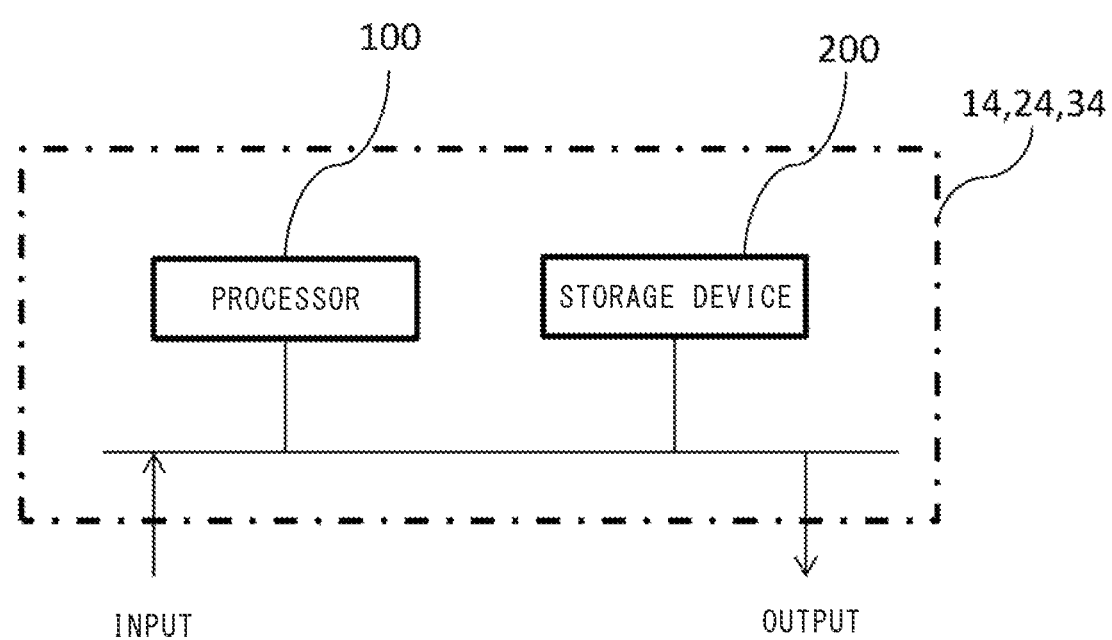
FIG. 2 is a diagram showing a hardware configuration of each of control devices in FIG. 1.
Figure 3:
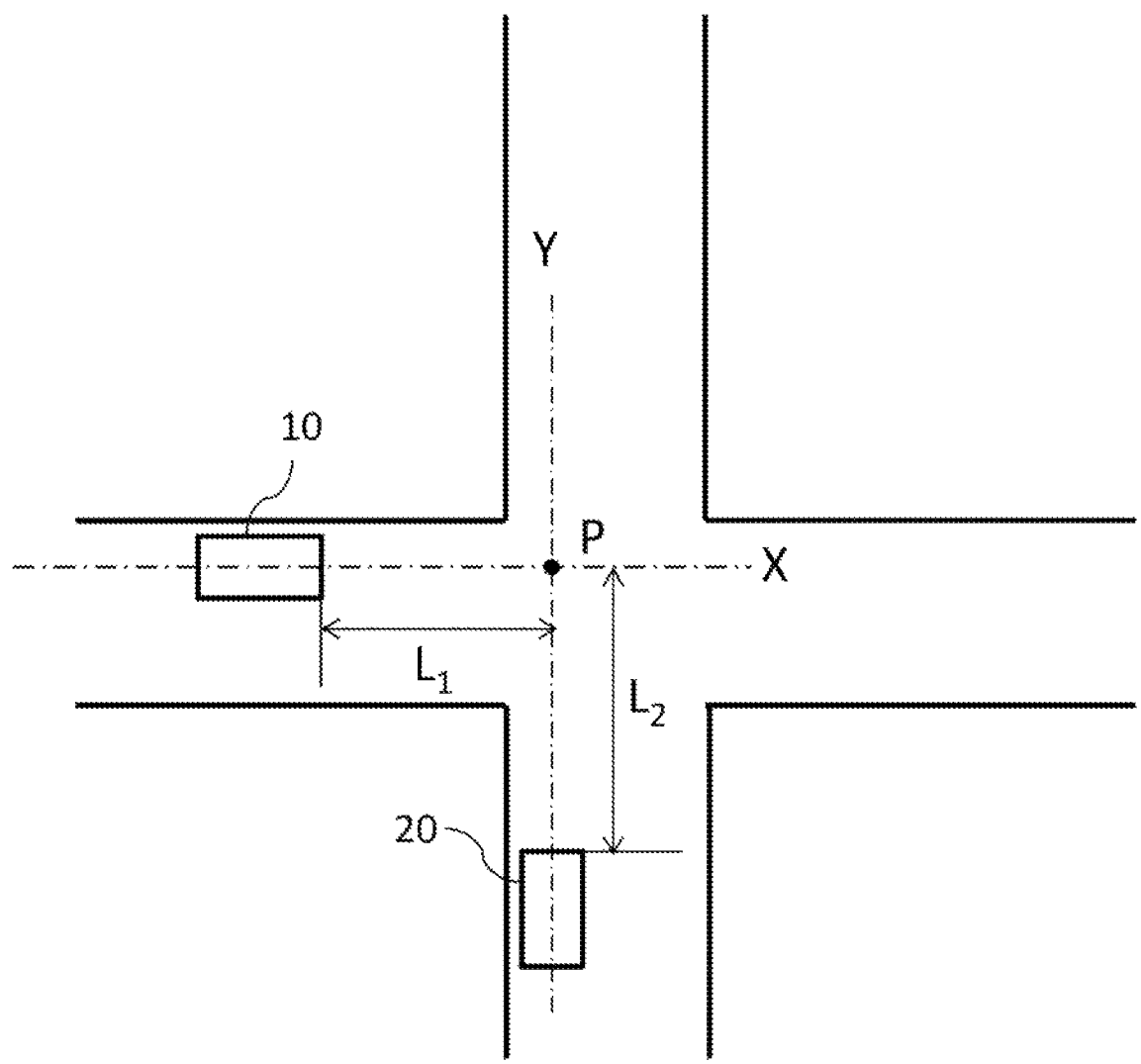
FIG. 3 is a diagram showing a positional relationship between vehicles when the V2X communication system according to embodiment 1 is applied to an intersection collision prevention warning system.
Figure 4:
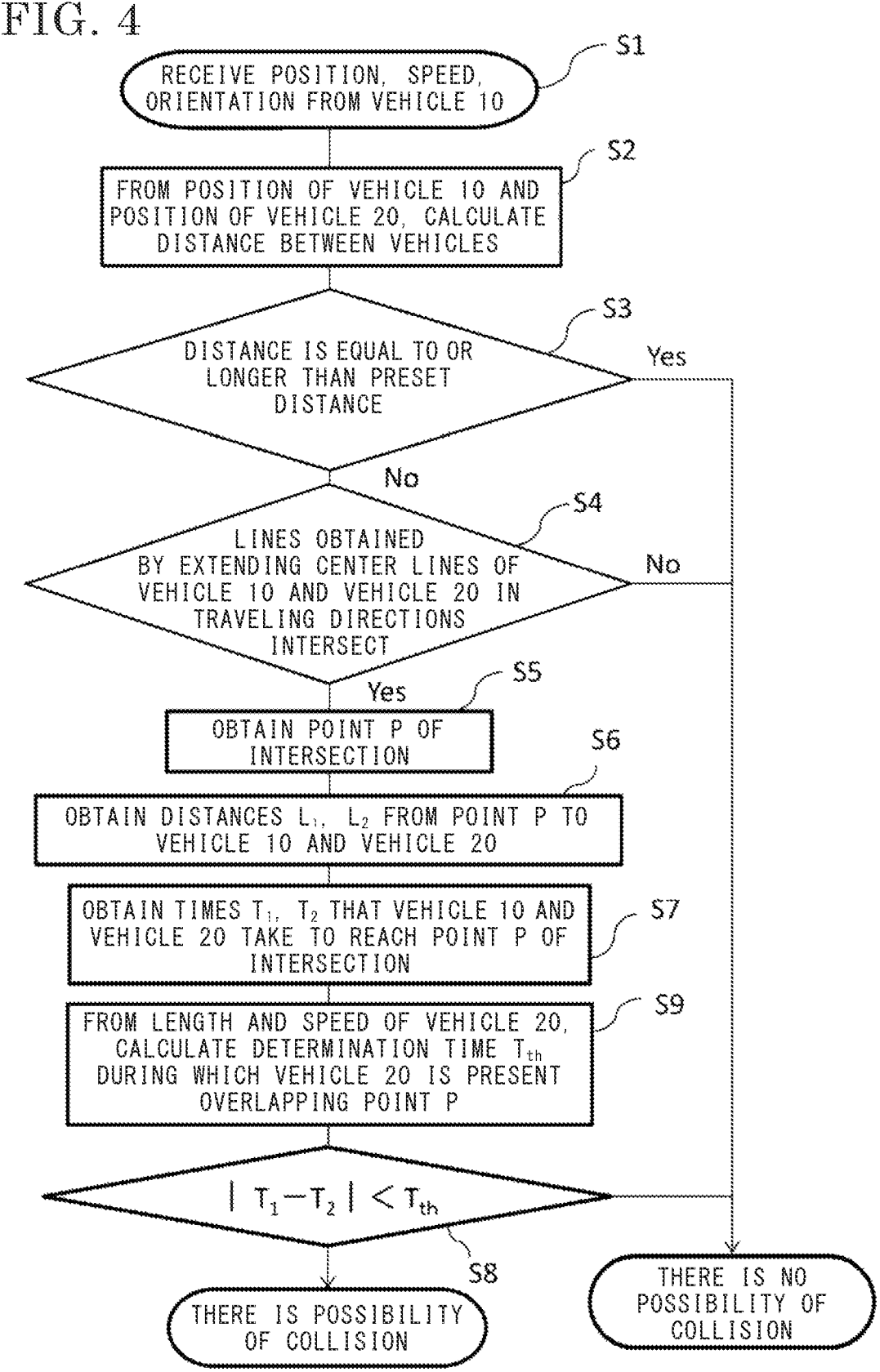
FIG. 4 is a flowchart for illustrating operations of V2X vehicle-mounted devices and a V2X relay of the intersection collision prevention warning system.

FIG. 1 is a diagram showing an overall configuration of a V2X communication system according to embodiment 1, FIG. 2 is a diagram showing a hardware configuration of each of control devices mounted in V2X vehicle-mounted devices 101 and 201 in the V2X communication system in FIG. 1, FIG. 3 is a diagram showing a positional relationship between vehicles when the V2X communication system is applied to an intersection collision prevention warning system, and FIG. 4 is a flowchart for illustrating operations of the V2X vehicle-mounted devices 101 and 201 and a V2X relay 301, using the intersection collision prevention warning system as an example.

The V2X communication system according to embodiment 1 will be described with reference to FIG. 1. In embodiment 1, the V2X communication system is used in an intersection collision prevention warning system described below. In addition to the control devices 14 and 24 described above, measurement means 11 and 21, and communication means 12 and 13, and 22 and 23, are mounted in the V2X vehicle-mounted devices 101 and 201 of a vehicle 10 and a vehicle 20. The measurement means 11 and 21 each measure vehicle information including a position, a speed, and an orientation of the host vehicle by using a satellite positioning system such as a GNSS (Global Navigation Satellite System). The measured vehicle information is directly communicated (transmitted/received) between the vehicle 10 and the vehicle 20 by the communication means 12 and 22, and are also cyclically (e.g., every 100 ms) transmitted/received between the vehicle 10 and the vehicle 20 via relay communication means 33 in the V2X relay 301 of a base station 30 by the communication means 13 and 23. Note that wireless communication is indicated by the dashed arrows in FIG. 1.

Meanwhile, the possibility of a collision with the vehicle 20 is determined by the control device 14 from the position, the speed, and the orientation of the vehicle 20 received by the communication means 12 or the communication means 13 of the vehicle 10, and the position, the speed, and the orientation of the host vehicle measured by the vehicle 10. If there is the possibility of a collision, a warning notification is provided to the driver in accordance with an instruction from the control device 14. The case where the same vehicle information is received from both the communication means 12 and the communication means 13, is as follows. The received pieces of vehicle information are compared, and if the pieces of the vehicle information are identical, the piece received later is discarded.

In the present embodiment, direct communication between two vehicles is described as an example. However, in reality, direct communication is mutually performed among a plurality of vehicles on a road as described above. In addition, a plurality of base stations are also present, and the vehicles perform transmission and reception to and from the base stations as described above.

FIG. 2 shows an example of hardware in the control device 14. The hardware is composed of a processor 100 and a storage device 200. Although not shown, the storage device 200 includes a volatile storage device such as a random access memory, and a nonvolatile auxiliary storage device such as a flash memory. The storage device 200 may include, instead of a flash memory, a hard disk as the auxiliary storage device. By executing a program as shown in the flowchart (described later) in FIG. 4 inputted from the storage device 200, the processor 100 receives information by, for example, the measurement means 11 and the communication means 12, 13 described above, determines the possibility of a collision described below, and provides a warning notification. In this case, the program is inputted from the auxiliary storage device via the volatile storage device to the processor 100. The processor 100 may output data such as a calculation result to the volatile storage device of the storage device 200, or may save the data into the auxiliary storage device via the volatile storage device. Note that this hardware configuration applies also to the configurations of the control device 24 in the V2X vehicle-mounted device 201 of the vehicle 20 and the control device 34 in the V2X relay 301 of the base station 30.

Next, a procedure according to which the intersection collision prevention warning system to which the V2X communication system has been applied determines the possibility of a collision with another vehicle, will be described with reference to FIG. 3 and FIG. 4.

The communication means 22 of the vehicle 20 receives the position, the speed, and the orientation of the vehicle 10 from the vehicle 10 (step S1 in FIG. 4). The distance between the vehicle 10 and the vehicle 20 is calculated by the control device 24 shown in FIG. 1 from the position of the vehicle 10 and the position of the vehicle 20 (step S2).

If the distance between the vehicle 10 and the vehicle 20 is equal to or longer than a preset distance (e.g., 300 m within which communication is considered to be executable through direct communication in the V2X communication system) (step S3), it is determined that there is no possibility of a collision, and the processing is ended.

If the distance between the vehicle 10 and the vehicle 20 is shorter than the preset distance, determination is made as to whether a line X obtained by extending a center line of the vehicle 10 in the traveling direction intersects a line Y obtained by extending a center line of the vehicle 20 in the traveling direction as shown in FIG. 3 (step S4; it is obvious that whether or not these lines intersect can be geometrically determined, and the description thereof is thus omitted here).

If the line X obtained by extending the center line of the vehicle 10 in the traveling direction does not intersect the line Y obtained by extending the center line of the vehicle 20 in the traveling direction, it is determined that there is no possibility of a collision, and the processing is ended.

If the line X obtained by extending the center line of the vehicle 10 in the traveling direction intersects the line Y obtained by extending the center line of the vehicle 20 in the traveling direction, the coordinates of an intersection point P are obtained (step S5), and the distance $L_1$ from the vehicle 10 to the intersection point P and the distance $L_2$ from the vehicle 20 to the intersection point P are obtained (step S6). By dividing $L_1$ by the speed of the vehicle 10 and dividing $L_2$ by the speed of the vehicle 20, times $T_1$ and $T_2$ that the respective vehicles take to reach the intersection point P are obtained (step S7). If the difference between $T_1$ and $T_2$ is within a determination time $T_{th}$, it is determined that there is the possibility of a collision (step S8), and a warning or the like is generated.

The determination time $T_{th}$ is set by, for example, calculating, from the length and the speed of the vehicle 20, a time during which the vehicle 20 is present overlapping the intersection point P (step S9), whereby it is possible to determine whether there will be a collision with the vehicle 10 at the intersection point P.

Next, with reference to the time-series chart in FIG. 6, a case will be described where the vehicle 10 has entered a direct transmission difficulty area D in which radio waves transmitted at the time of direct communication of the vehicle information from the vehicle 10 do not reach the vehicle 20 due to blocking of the radio waves by a building 50, as in the case in FIG. 5.

The V2X relay 301 in the base station 30 shown in FIG. 1 includes a list of direct transmission difficulty areas including the direct transmission difficulty area D described above, and transmits the list to the communication means 13 of the vehicle 10 from the relay communication means 33 at a constant cycle (e.g., every 180 seconds) (step t1).

The vehicle 10 simultaneously transmits the vehicle information to nearby vehicles including the vehicle 20 every 100 milliseconds by the communication means 12 shown in FIG. 1 (step t2). If it is determined, by transmission necessity determination processing performed by the control device 14, that a range of the traveling orientation and the position of the host vehicle are included in the direct transmission difficulty area D indicated in the list of direct transmission difficulty areas received from the base station 30, the vehicle information is transmitted to the relay communication means 33 of the base station 30 by the communication means 13 (step t3).

The base station 30 transmits the vehicle information received from the communication means 13 of the vehicle 10, to the communication means 23 of the vehicle 20 via the relay communication means 33 (step t4).

The transmission necessity determination processing is performed on a regular basis, and the transmission of the vehicle information to the base station 30 is stopped when the position of the vehicle 10 is outside the direct transmission difficulty area D (step t5).

Note that the list of direct transmission difficulty areas obtained by the vehicle 10 may be stored in the storage device 200 in the control device 34 of the V2X relay 301 or may be stored in a storage device outside the control device 34.

Figure 5:
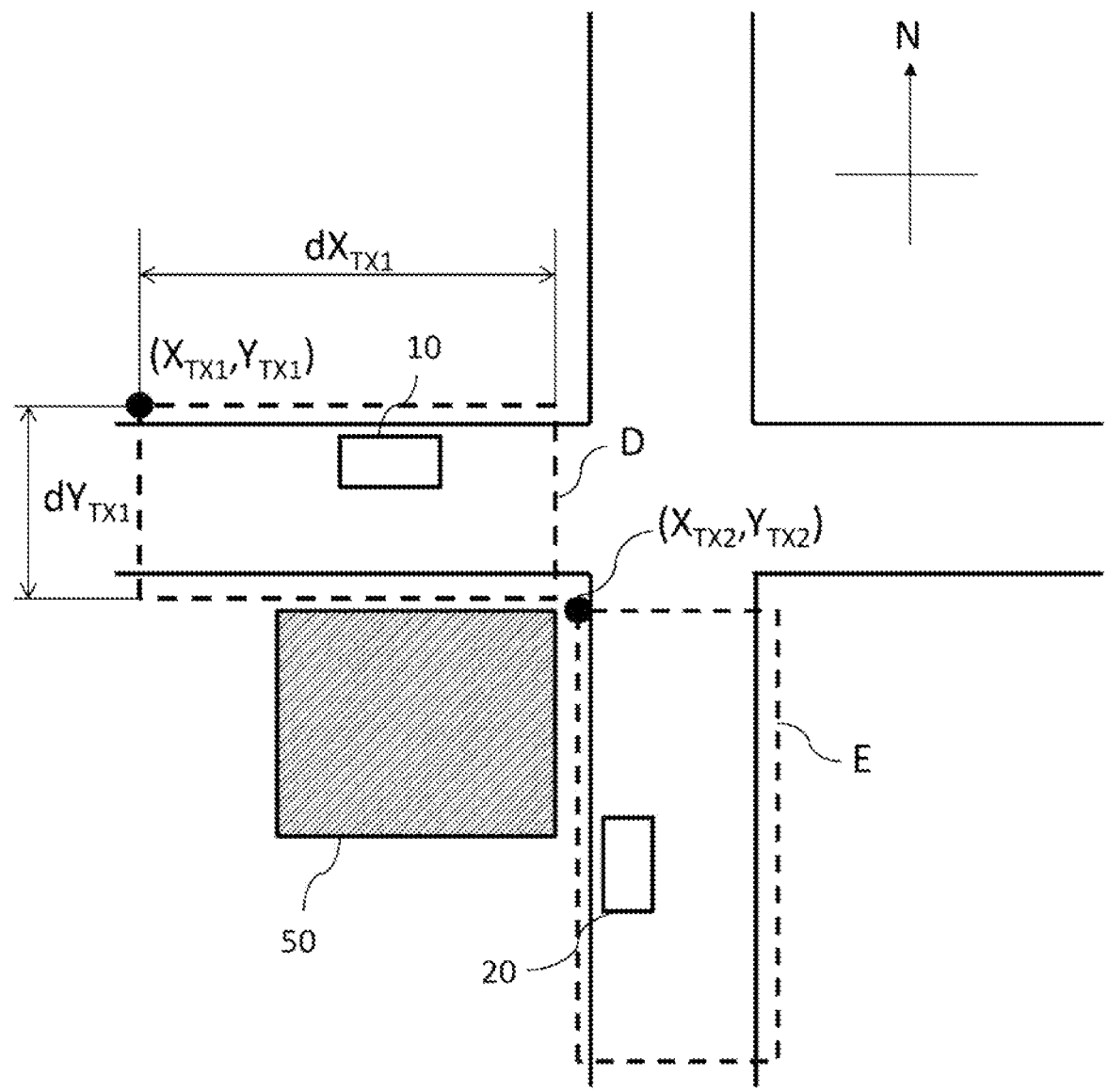
FIG. 5 is a diagram showing a positional relationship between the vehicles and a building when the V2X communication system according to embodiment 1 is applied to the intersection collision prevention warning system.
Figure 6:
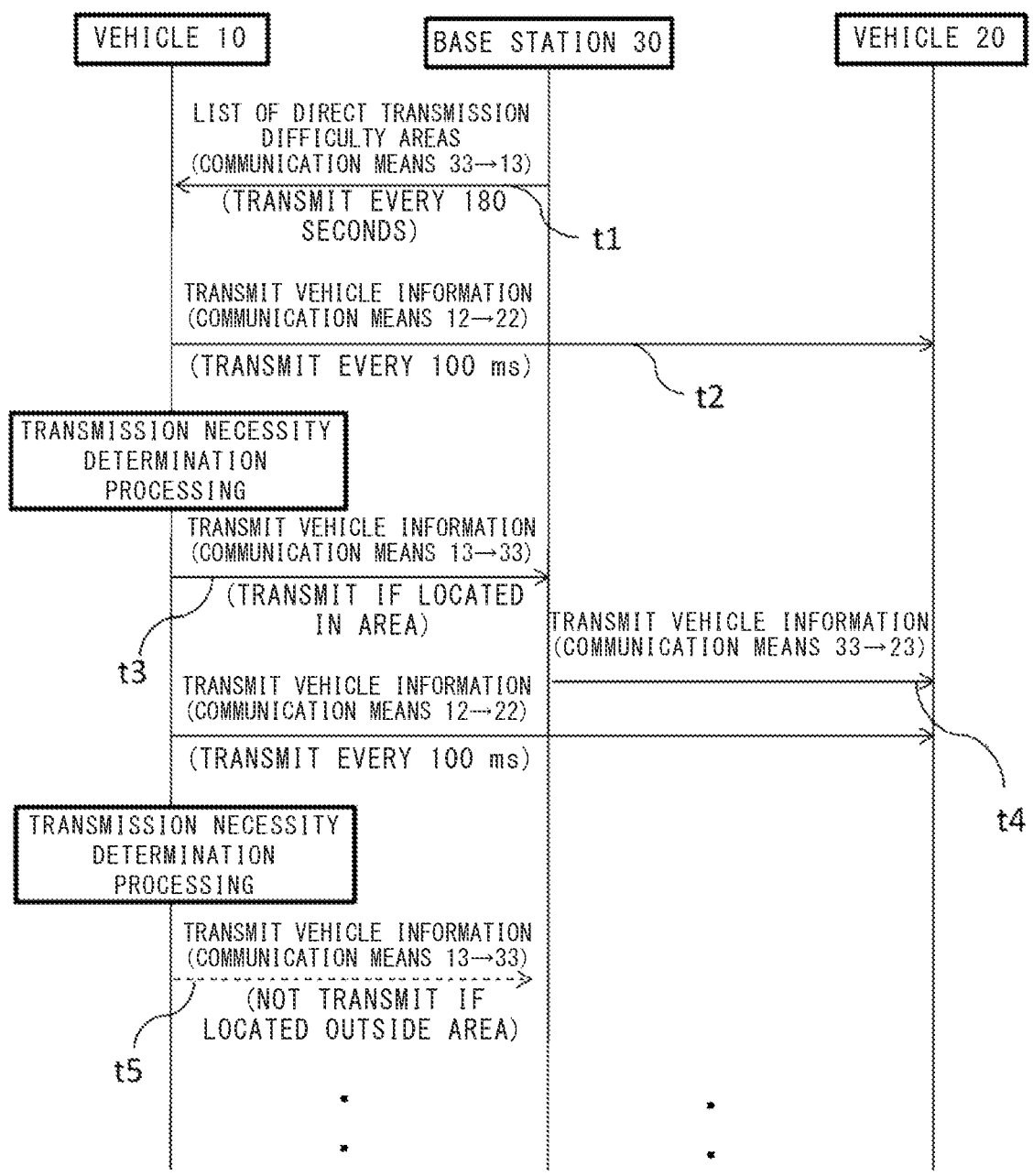
FIG. 6 is a time-series chart in the case where a vehicle has entered a direct transmission difficulty area in FIG. 5.

A direct transmission difficulty area is represented as, for example, a rectangular region based on a latitude and a longitude, as the direct transmission difficulty area D is indicated in FIG. 5. Data string is as shown in FIG. 7. Similarly, as shown in FIG. 5, a region in which radio waves transmitted from the vehicle 20 do not directly reach the vehicle 10 owing to the building 50 is indicated as a direct transmission difficulty area E. These areas are collected to form the list of direct transmission difficulty areas.

Figure 9:
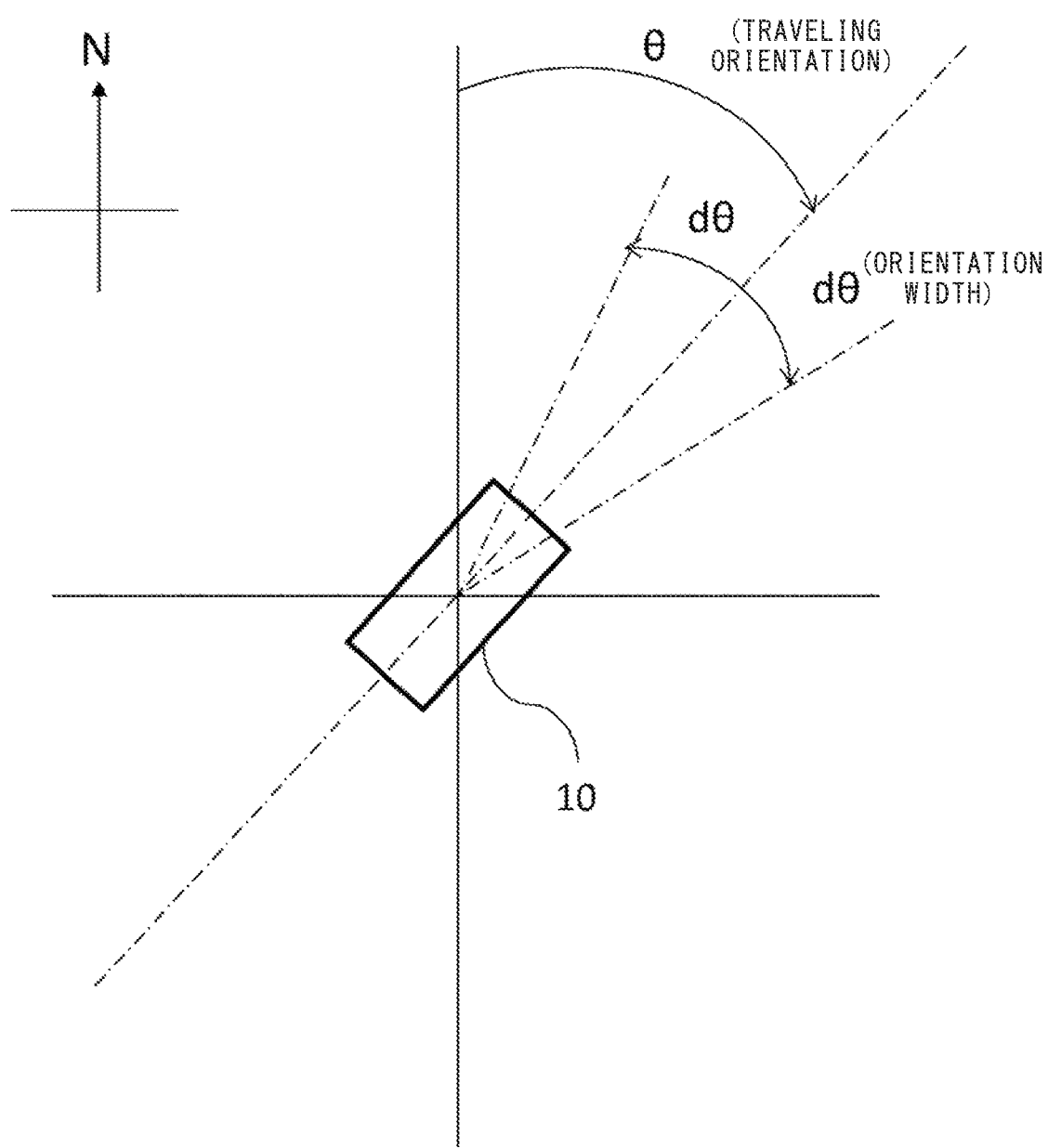
FIG. 9 is a diagram illustrating a traveling orientation in FIG. 8.

As shown in FIG. 8, in addition to data regarding the latitude and the longitude, a traveling orientation may be added to the data. When the traveling orientation of the vehicle 10 shown in FIG. 5 is the leftward direction (westward), the vehicle 10 is not traveling in such an orientation as to approach the intersection, and there is no risk of a collision. Therefore, the radio waves that the vehicle 10 has simultaneously transmitted through direct communication by the communication means 12 do not need to be delivered to the vehicle 20. By adding the traveling orientation as a condition in this manner, it is possible to inhibit the relaying of the transmission of unnecessary data which are not used for determination in a collision warning determination of the present embodiment. FIG. 9 is a diagram illustrating the traveling orientation. How much the orientation of traveling is inclined from the northward direction is indicated by θ, and a deviation from the traveling orientation θ is indicated by an orientation width dθ.

Thus, embodiment 1 has a configuration in which: the list of direct transmission difficulty areas having listed areas in which direct transmission is difficult is transmitted from the V2X relay 301 to the V2X vehicle-mounted device 101; and the V2X vehicle-mounted device 101 performs transmission to the V2X relay 301 only if the position of the host vehicle is included in the list of direct transmission difficulty areas. Consequently, it is possible to inhibit transmission when relaying is unnecessary.

Accordingly, the vehicle information is received via the base station only if direct communication between the vehicles cannot be performed, and it is therefore possible to suppress increase in the communication traffic amount. In the intersection collision prevention warning system, it is possible to perform safer driving assistance without causing any delay in transmission/reception of the vehicle information.

Furthermore, by adding the traveling orientation of the vehicle as a condition in the list of direct transmission difficulty areas, it is possible to inhibit transmission from the V2X vehicle-mounted device 101 of the vehicle 10, direct transmission by which is difficult, but which is traveling in a direction that makes relaying unnecessary. This can eliminate the need for transmission of data which is not used for determination in the safe driving system, and further makes it possible to suppress increase in the communication traffic amount. Note that although the present embodiment has been described by using an example in which the list of direct transmission difficulty areas is transmitted to the vehicle 10, the same effects can be achieved by performing the same operations also when the list of direct transmission difficulty areas is transmitted to the vehicle 20 or another vehicle.

Embodiment 2

In embodiment 1, whether or not the range of the traveling orientation or the position of the host vehicle is included in the direct transmission difficulty area D indicated in the list of direct transmission difficulty areas received from the base station 30 is determined in the transmission necessity determination processing performed by the control device 14 of the vehicle 10. However, this determination may be performed by the V2X relay 301 of the base station 30. Here, the vehicle information and the list of direct transmission difficulty areas are the same data as those in embodiment 1.

Figure 10:
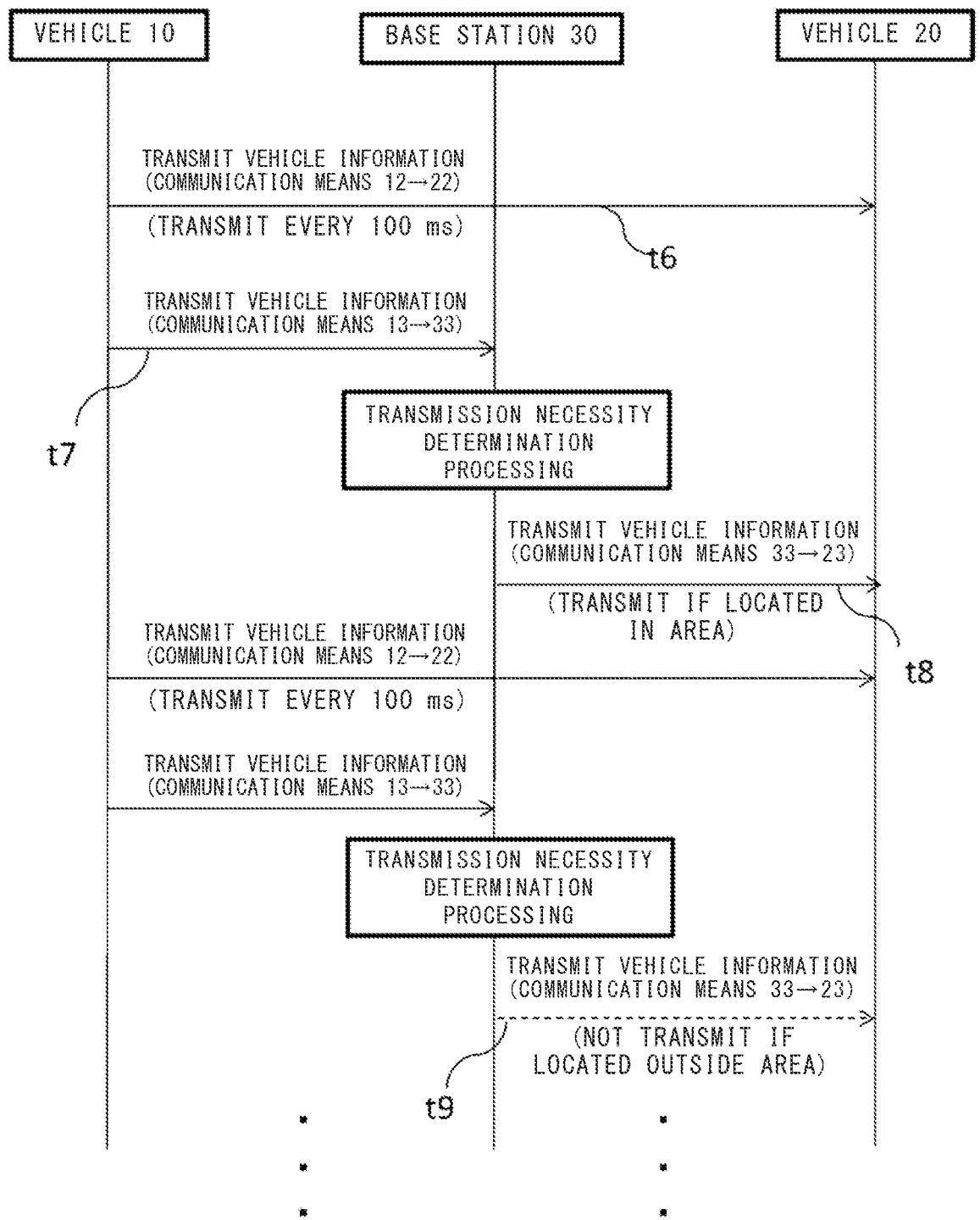
FIG. 10 is a time-series chart in the case where the vehicle has entered the direct transmission difficulty area when a V2X communication system according to embodiment 2 is applied to the intersection collision prevention warning system.

FIG. 10 is a time-series chart in the case where the control device 34 in the V2X relay 301 of the base station 30 performs determination processing for determining the necessity of transmission of the vehicle information when the vehicle 10 has entered the direct transmission difficulty area D in which radio waves transmitted at the time of direct communication of the vehicle information from the vehicle 10 do not reach the vehicle 20 due to blocking of the radio waves by the building 50, as described with reference to FIG. 5.

The vehicle 10 simultaneously transmits the vehicle information to nearby vehicles including the vehicle 20 every 100 milliseconds by the communication means 12 shown in FIG. 1 (step t6). Along with this, the vehicle 10 transmits the vehicle information to the relay communication means 33 in the V2X relay 301 by the communication means 13 (step t7). The relay communication means 33 receives the vehicle information about the vehicle 10. If it is determined, in the transmission necessity determination processing performed by the control device 34, that the range of the traveling orientation and the position of the vehicle 10 are included in the direct transmission difficulty area D indicated in the list of direct transmission difficulty areas which is held by the V2X relay 301, the vehicle information is transmitted to the communication means 23 of the vehicle 20 by the relay communication means 33 (step t8). The transmission necessity determination processing in the base station 30 is performed each time the vehicle information from the vehicle 10 is received, and the transmission of the vehicle information to the communication means 23 is stopped when the position of the vehicle 10 is outside the direct transmission difficulty area D (step t9). Note that the list of direct transmission difficulty areas may be stored in the storage device 200 in the control device 34 of the V2X relay 301 or may be stored in a storage device outside the control device 34.

Thus, embodiment 2 has a configuration in which: the list of direct transmission difficulty areas having listed areas in which direct transmission is difficult is provided in the base station 30; and the V2X relay 301 performs transmission to the V2X vehicle-mounted device which is the relay destination, only if the position of the V2X vehicle-mounted device included in the received vehicle information is included in the list of direct transmission difficulty areas. Consequently, it is possible to inhibit transmission when relaying is unnecessary.

Accordingly, the V2X relay 301 of the base station 30 determines whether or not the said position is included in the direct transmission difficulty area, and it is therefore not necessary to transmit the list of direct transmission difficulty areas to any vehicle. In addition, the vehicle information is received via the base station only if direct communication between the vehicles cannot be performed, and it is therefore possible to suppress increase in the communication traffic amount. In the intersection collision prevention warning system, it is possible to perform safer driving assistance without causing any delay in transmission/reception of the vehicle information.

Furthermore, by adding the traveling orientation of the vehicle as a condition in the list of direct transmission difficulty areas in the same manner as in embodiment 1, it is possible to inhibit the relaying for the V2X vehicle-mounted device 101 of the vehicle 10, direct transmission by which is difficult, but which is traveling in a direction that makes relaying unnecessary. Note that although the present embodiment has been described by using the vehicle 10 as an example, the same effects can be achieved by performing the same operations also in the case of the vehicle 20 or another vehicle.

Embodiment 3

In embodiments 1 and 2, the inhibition of transmission when relaying is unnecessary is performed by using the list of direct transmission difficulty areas. Meanwhile, a list of direct reception difficulty areas may be held instead of the list of direct transmission difficulty areas.

Figure 11:
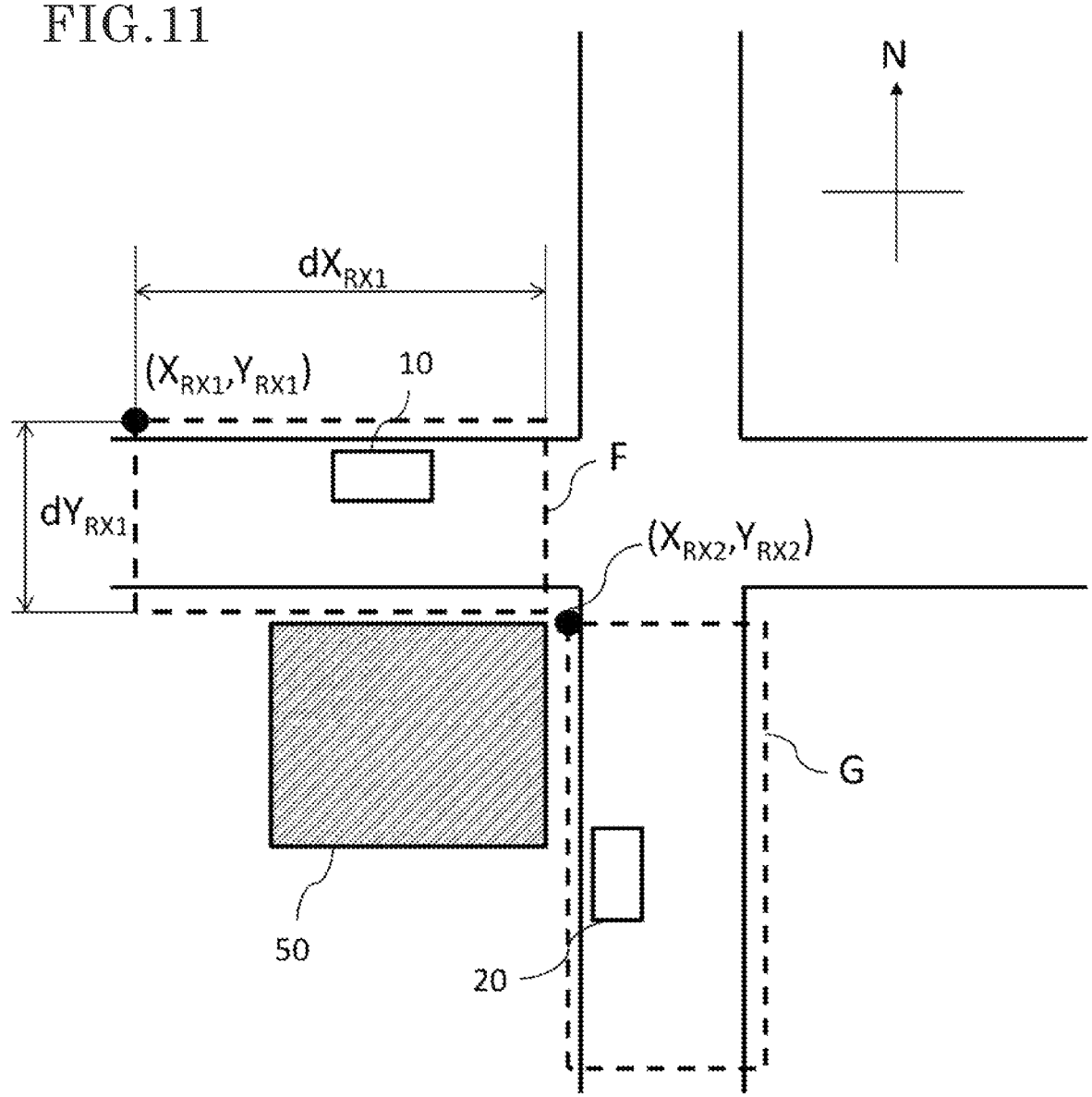
FIG. 11 is a diagram illustrating direct reception difficulty areas when a V2X communication system according to embodiment 3 is applied to the intersection collision prevention warning system.

Hereinafter, the list of direct reception difficulty areas will be described with reference to FIG. 11 to FIG. 13. FIG. 11 shows an example of direct reception difficulty areas. An area (hereinafter, referred to as a direct reception difficulty area) F is present in which radio waves transmitted from the vehicle 20 when simultaneous transmission is performed from the vehicle 20 through direct transmission by the communication means 22 do not reach the vehicle 10 due to blocking of the radio waves by the building 50 located between the vehicles.

In the same manner as the direct transmission difficulty areas shown in FIG. 5 and FIG. 7, the direct reception difficulty area F is represented as a rectangular region based on a latitude and a longitude as shown in FIG. 12. Similarly, a region, shown in FIG. 11, in which radio waves do not reach the vehicle 20 owing to the building 50 is indicated as a direct reception difficulty area G, and the direct reception difficulty areas of the vehicles are collected to form the list of direct reception difficulty areas.

As shown in FIG. 13, in addition to the latitude and the longitude, a traveling orientation may be added to the list of direct reception difficulty areas. When the traveling orientation of the vehicle 20 shown in FIG. 11 is the downward direction (southward), there is no risk of a collision, and, therefore, the radio waves that the vehicle 10 has simultaneously transmitted through direct communication by the communication means 12 do not need to reach the vehicle 20. By adding the traveling orientation as a condition, it is possible to inhibit unnecessary relaying. Note that the manner in which the traveling orientation is represented is the same as that in FIG. 8.

Figure 14:
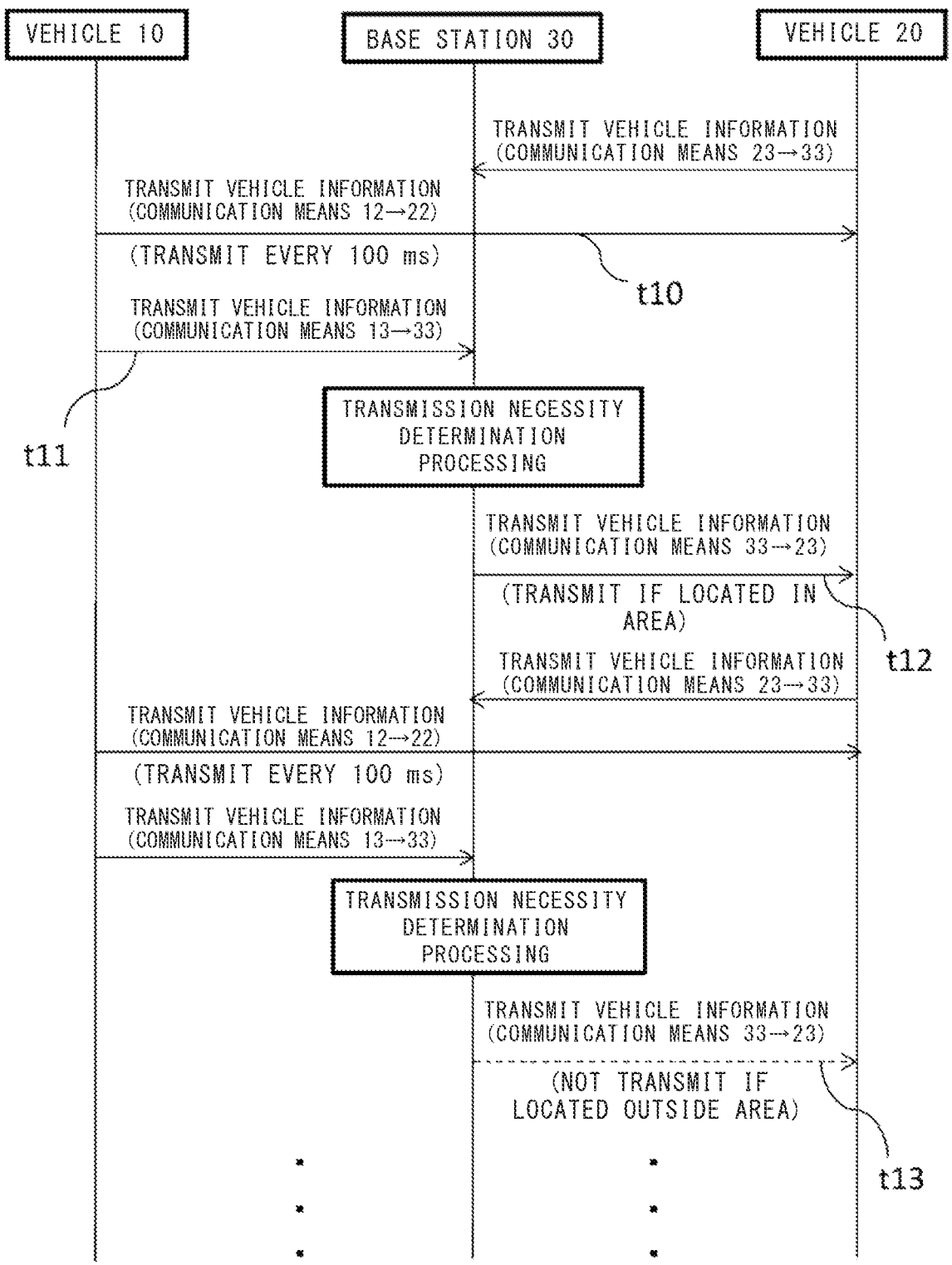
FIG. 14 is a time-series chart in the case where a vehicle has entered a direct reception difficulty area in FIG. 11.

FIG. 14 is a time-series chart in the case where the control device 34 in the V2X relay 301 of the base station 30 performs determination processing for determining the necessity of transmission of the vehicle information when the vehicle 10 has entered the direct reception difficulty area F.

The vehicle 10 simultaneously transmits the vehicle information to nearby vehicles including the vehicle 20 every 100 milliseconds by the communication means 12 shown in FIG. 1 (step t10). Along with this, the vehicle 10 transmits the vehicle information to the relay communication means 33 in the V2X relay 301 of the base station 30 by the communication means 13 (step t11). When the relay communication means 33 receives the vehicle information about the vehicle 10, the relay communication means 33 transmits the vehicle information to the communication means 23 of the vehicle 20 if it is determined, in the transmission necessity determination processing performed by the control device 34, that the position and the traveling orientation of the vehicle 20 included in vehicle information received in advance from the vehicle 20 are included in the direct reception difficulty area F indicated in the list of direct reception difficulty areas which is held by the V2X relay 301 (step t12). The transmission necessity determination processing in the base station 30 is performed each time the vehicle information from the vehicle 10 is received, and the transmission of the vehicle information to the communication means 23 is stopped when the position of the vehicle 10 is outside the direct reception difficulty area F (step t13). Note that the list of direct reception difficulty areas in the V2X relay 301 may be stored in the storage device 200 in the control device 34 or may be stored in a storage device outside the control device 34.

Thus, embodiment 3 has a configuration in which: the list of direct reception difficulty areas having listed areas in which direct reception is difficult is provided; and the V2X relay 301 performs transmission to the V2X vehicle-mounted device 201 which is the relay destination, only if the position of the vehicle included in the vehicle information received in advance from the V2X vehicle-mounted device 201 which is the relay destination is included in the list of direct reception difficulty areas. Consequently, it is possible to inhibit transmission when relaying is unnecessary.

Accordingly, the V2X relay 301 of the base station 30 determines whether or not the said position is included in the direct reception difficulty area, and it is therefore not necessary to transmit the list of direct reception difficulty areas to any vehicle. In addition, the vehicle information is received via the base station only if direct communication between the vehicles cannot be performed, and it is therefore possible to suppress increase in the communication traffic amount. In the intersection collision prevention warning system, it is possible to perform safer driving assistance without causing any delay in transmission/reception of the vehicle information.

Furthermore, by adding the traveling orientation of the vehicle as a condition in the list of direct reception difficulty areas, it is possible to inhibit transmission to the V2X vehicle-mounted device 201 of the vehicle 20, direct reception by which is difficult, but which is traveling in a direction that makes relaying unnecessary. Note that although the present embodiment has been described by using the vehicle 20 as an example, the same effects can be achieved by performing the same operations also in the case of the vehicle 10 or another vehicle.

Although each of the embodiments of the present disclosure has described the delivery and reception of information between the vehicles and between each vehicle and the base station when the V2X communication system is applied to an intersection collision prevention warning system, the V2X communication system is applicable to various traffic systems that use information about direct transmission difficulty areas or direct reception difficulty areas and that can suppress increase in the communication traffic amount between the vehicle and the base station.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10, 20 vehicle
12, 13, 22, 23 communication means
11, 21 measurement means
33 relay communication means
14, 24, 34 control device
101, 201 V2X vehicle-mounted device
301 V2X relay

The invention claimed is:

1. A V2X vehicle-mounted device comprising:
first wireless communication device configured to directly transmit vehicle information to another vehicle in communication range;
second wireless communication device configured to communicate with a base station; and
processing circuitry, based on the vehicle information and receiving by the second wireless communication device information about an area in which direct transmission to the another vehicle is blocked by an object, to determine the presence or absence of the another vehicle in the area in which direct transmission is blocked by the object, wherein
the V2X vehicle-mounted device is configured to transmit the vehicle information by the second wireless communication device only if it is determined that a direct transmission to the another vehicle is blocked by the object.

2. The V2X vehicle-mounted device according to claim 1, wherein the vehicle information comprises a position, a speed, and an orientation of a vehicle.

3. The V2X vehicle-mounted device according to claim 1, wherein the information about the area in which direct transmission to the another vehicle is blocked by the object comprises a latitude and a longitude of the area.

4. The V2X vehicle-mounted device according to claim 1, wherein the information about the area in which direct transmission to the another vehicle is blocked by the object comprises a latitude and a longitude of the area, and a traveling orientation.

5. A V2X relay comprising:
relay wireless communication device configured to receive vehicle information about a first vehicle and transmit the vehicle information to a second vehicle in communication range; and
processing circuitry configured to, based on the vehicle information and information about an area in which direct transmission from the first vehicle to the second vehicle is blocked by an object, determine the presence or absence of the first vehicle in the area, wherein
the V2X relay is configured to transmit the vehicle information to the second vehicle only if it is determined that the first vehicle is present in the area.

6. The V2X relay according to claim 5, wherein the vehicle information comprises a position, a speed, and an orientation of a vehicle.

7. The V2X relay according to claim 5, wherein the information about the area in which direct transmission from the first vehicle to the second vehicle is blocked by the object comprises a latitude and a longitude of the area.

8. The V2X relay according to claim 5, wherein the information about the area in which direct transmission from the first vehicle to the second vehicle is blocked by the object comprises a latitude and a longitude of the area, and a traveling orientation based on the vehicle information.

9. A V2X relay comprising:
relay wireless communication device configured to receive first vehicle information about a first vehicle and transmit the first vehicle information to a second vehicle in communication range; and
processing circuitry configured to, based on second vehicle information about the second vehicle and information about an area in which direct transmission from the first vehicle to the second vehicle is blocked by an object, determine the presence or absence of the second vehicle in the area, wherein
the V2X relay is configured to transmit the first vehicle information to the second vehicle only if it is determined that the second vehicle is present in the area.

10. The V2X relay according to claim 9, wherein the first vehicle information and the second vehicle information each comprise a position, a speed, and an orientation of a vehicle.

11. The V2X relay according to claim 9, wherein the information about the area in which direct transmission from the first vehicle to the second vehicle is blocked by the object comprises a latitude and a longitude of the area.

12. The V2X relay according to claim 9, wherein the information about the area in which direct transmission from the first vehicle to the second vehicle is blocked by the object comprises a latitude and a longitude of the area, and a traveling orientation based on the vehicle information.

13. The V2X vehicle-mounted device according to claim 2, wherein the information about the area in which direct transmission to the another vehicle is blocked by the object comprises a latitude and a longitude of the area.

14. The V2X vehicle-mounted device according to claim 2, wherein the information about the area in which direct transmission to the another vehicle is blocked by the object comprises a latitude and a longitude of the area, and a traveling orientation.

15. The V2X relay according to claim 6, wherein the information about the area in which direct transmission from the first vehicle to the second vehicle is blocked by the object comprises a latitude and a longitude of the area.

16. The V2X relay according to claim 6, wherein the information about the area in which direct transmission from the first vehicle to the second vehicle is blocked by the object comprises a latitude and a longitude of the area, and a traveling orientation based on the vehicle information.

17. The V2X relay according to claim 10, wherein the information about the area in which direct transmission from the first vehicle to the second vehicle is blocked by the object comprises a latitude and a longitude of the area.

18. The V2X relay according to claim 10, wherein the information about the area in which direct transmission from the first vehicle to the second vehicle is blocked by the object comprises a latitude and a longitude of the area, and a traveling orientation based on the vehicle information.

* * * * *